US006524633B2

(12) United States Patent
Rainbolt et al.

(10) Patent No.: US 6,524,633 B2
(45) Date of Patent: *Feb. 25, 2003

(54) PROCESS AND APPARATUS FOR PREPARING PEPPERONI

(75) Inventors: Luke B. Rainbolt; James Roberds, both of Keller; Kyle A. Newkirk, North Richland Hills, all of TX (US)

(73) Assignee: H&M Food Systems Company, Inc., Springdale, AK (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/246,783

(22) Filed: Feb. 5, 1999

(65) Prior Publication Data

US 2002/0071899 A1 Jun. 13, 2002

Related U.S. Application Data

(63) Continuation-in-part of application No. 09/061,584, filed on Apr. 16, 1998, now Pat. No. 5,942,265.

(51) Int. Cl.[7] .............................. A23L 1/31; A01N 1/10
(52) U.S. Cl. ........................ 426/59; 426/466; 426/513; 426/517; 426/646; 426/518; 99/355; 99/433 C; 99/470; 99/537
(58) Field of Search .................... 426/55, 646, 466, 426/467, 513, 516, 518, 520, 59, 524, 517; 99/427, 443 C, 450, 470, 474, 478

(56) References Cited

U.S. PATENT DOCUMENTS

| 2,346,232 | A | | 4/1944 | Piret et al. .................... 99/208 |
|---|---|---|---|---|
| 3,482,996 | A | | 12/1969 | Christianson et al. ......... 99/109 |
| 3,634,102 | A | * | 1/1972 | Paynter et al. ................. 99/174 |
| 3,664,396 | A | | 5/1972 | Tremblay ................. 146/78 A |
| 3,831,389 | A | | 8/1974 | Lipona ........................... 62/63 |
| 3,846,571 | A | * | 11/1974 | Kremnev et al. ........... 426/415 |
| 3,943,842 | A | * | 3/1976 | Bills et al. ..................... 99/473 |
| 4,079,666 | A | | 3/1978 | Plemons et al. .............. 99/355 |
| 4,166,138 | A | | 8/1979 | Ziminski et al. ............ 426/249 |
| 4,196,222 | A | | 4/1980 | Cheney ....................... 426/264 |
| 4,200,959 | A | | 5/1980 | Cheney .......................... 17/32 |

(List continued on next page.)

Primary Examiner—Keith Hendricks
Assistant Examiner—Drew Becker
(74) Attorney, Agent, or Firm—McAfee & Taft (57) ABSTRACT

A process for preparing diced or sliced sausage, e.g. pepperoni, includes the steps of preparing the meat mixture by grinding and mixing to specification. The sausage is stuffed into casings or is extruded into sheet form for fermentation and cooking, following which the cooled meat mixture is chilled to 35° F. or lower and sliced or sliced and diced. The product is thereafter conveyed to a spiral dryer where it is exposed to relatively warm (about 50° F. to 120° F.) air at an initial relative humidity of 50% or less, preferably 30% or less, under turbulent air flow. The dried sausage is then conveyed to a chiller or freezer. Pepperoni prepared in this process has desirable flow characteristics when compared to product made using known pepperoni manufacturing processes. In the most preferred embodiment the conditioned air enters the lower portion of the spiral dryer along with the meat pieces and the resulting product is more consistent than if conventional top/down air flow was used in the dryer.

41 Claims, 4 Drawing Sheets

U.S. PATENT DOCUMENTS

| | | | |
|---|---|---|---|
| 4,218,492 A | 8/1980 | Stead et al. | 426/646 |
| 4,260,640 A | 4/1981 | Hartmann et al. | 426/516 |
| 4,265,918 A | 5/1981 | Kueper et al. | 426/264 |
| 4,279,935 A | 7/1981 | Kentor | 426/264 |
| 4,305,965 A | 12/1981 | Cheney | 426/104 |
| 4,362,750 A | 12/1982 | Swartz | 426/59 |
| 4,530,132 A | 7/1985 | Wagner | 17/45 |
| 4,667,369 A | 5/1987 | Felstehausen | 17/32 |
| 4,927,650 A | 5/1990 | Roberts | 426/295 |
| 4,997,663 A * | 3/1991 | Potthast | 426/241 |
| 5,078,120 A | 1/1992 | Hwang | 126/21 A |
| 5,236,731 A | 8/1993 | Becker | 426/513 |
| 5,515,775 A * | 5/1996 | Crump III, et al. | 99/479 |
| RE35,259 E | 6/1996 | Williams | 126/369 |
| 5,736,186 A | 4/1998 | Holdren et al. | 426/646 |

* cited by examiner

PROCESS AND APPARATUS FOR PREPARING PEPPERONI

CROSS-REFERENCE TO RELATED APPLICATIONS

This application is a continuation-in-part of U.S. patent application Serial No. 09/061,584, filed Apr. 16, 1998, now U.S. Pat. No. 5,942,265, in the names of Jason Roberds, Luke B. Rainbolt and Kyle A. Newkirk, and entitled PROCESS AND APPARATUS FOR PREPARING PEPPERONI.

BACKGROUND OF THE INVENTION

1. Field of The Invention

The present invention relates generally to the art of preparing a dry or semi-dry sausage product, and more particularly it relates to a method of making pepperoni. In its most preferred form, the present invention relates to the preparation of diced or sliced pepperoni, wherein the sausage is cooked, with or without using casings, and wherein the dehydrating step is performed in a spiral dryer under turbulent air flow with the warm, dry air entering the spiral dryer at the lower end thereof along with the product.

2. Description of the Prior Art

Many different processes have been used in the prior art to manufacture cured, smoked, dried and semi-dried sausages, and many such processes are known for preparing pepperoni. In some of the prior art processes, the initial meat mixture is cured and thereafter dried or heated in air, sunlight, in drying rooms, smokehouses and the like. The cure or drying time in many of the historical processes, and some processes still being used, require many hours, days or even weeks. A wide variety of final products and qualities results from the use of age-old recipes and techniques.

Pepperoni is typically prepared by stuffing the desired meat mixture into casings and fermenting and drying the resultant product for extended periods. This particular sausage is most commonly served in thin slices, with or without the casing, the casing being removed after cooking if it is removed at all. Pepperoni pizzas, for example, are sold by most pizza producers throughout the world.

One prior art attempt at reducing the time required for the preparation of such sausage products is described in U.S. Pat. No. 2,346,232 issued Apr. 11, 1944 to Pirai, et al. for "Meat Process". In this patent, semi-dried meat for food ration purposes is prepared in shorter periods than were previously required, by exposing the meat mixture to a turbulent air flow to reduce the moisture content from an original 45–85% to 20–55%. The air used in this process is at a temperature of 0° C.–30° C. (32° F. to 86° F.) and the air is moved across the meat surface at a velocity of 1–18 feet/second. The meat products discussed in this patent are produced in ¼1–1¼ inch thick layers or in ropes of ⅜-inch diameter for drying. For ⅜-inch ropes, drying is accomplished to 28% in about 8–13 hours, while the 1¼-inch layers require 13 days, still a relatively short period when compared to earlier processes. The benefits of turbulent flow are said to be increased by 40% early in the process where the air contacts a moist surface. The effect of the turbulent air flow of this patent is substantially reduced as the drying continues. For example, in one test reported in the patent, drying of ⅜-inch ropes from 55% to 40% moisture took just three hours, while a further reduction to 28% required an additional five hours. It is interesting to note that the patent does not disclose any direct relationship between the humidity of the air used in the process and the time of drying. The patent claims up to 75% relative humidity, although many of the examples use relative humidities of 20–25%, 40% and 75%. Product is held in flat trays in the examples of the patent.

Another process for preparing sausages is disclosed in U.S. Pat. No. 3,482,996 issued Dec. 9, 1996 to Christianson, et al. for "Process for Preparing Dry and Semi-Dry Sausages". In this patent, the meat compositions include dehydrated, spun, edible protein fibers or dehydrated fibrous products derived from spun, edible protein fibers to substantially reduce drying time. The fibers allegedly take up the moisture which is typically removed in the drying room.

"Preparation of Partially Dehydrated Meat Products" is discussed in U.S. Pat. No. 4,265,918 issued to Kueper, et al. on May 5, 1981. The technique discussed in this patent includes immersion of the meat product in a curing solution, followed by vacuum dehydration. The initial hydration step is to about 105–125% of the products' original weight, followed by vacuum treatment to reduce the overall product weight to 70–95% of its original weight. The process is especially well suited for sliced meat products, like bacon.

Yet another process is described in Kentor's U.S. Pat. No. 4,279,935 issued Jul. 21, 1981 for "Dry Sausage Processing With Added Acid". In this process, bactericides and bacteriostats are first added to the meat, followed by treatment with an acidic mixture to reduce the Ph to about 5.7. The sausage is then heated to at least 58° C. and control dried to reduce the average moisture level to about 35%. The drying time is on the order of 5–20 days.

Another process for producing semi-dry sausage products, including pepperoni, is disclosed in U.S. Pat. No. 5,736,186 issued Apr. 7, 1998 to Holdren and entitled "Process For Producing Dry And Semi-Dry Sausage Products". In this patent, the process comprises mixing the basic meat ingredients and adding an encapsulated acidulant which has a melting point above 90° F. The product is formed into sausage shaped products in which the product has at least one cross-sectional dimension no greater than 1.0 inch. The raw meat and encapsulated acidulant are then heated for a time sufficient to melt the encapsulating material and to dehydrate the product to reduce the moisture-to-protein ratio to no greater than 3.7 to 1. The heating step is carried out in very short periods of time, at high temperatures in the range of 90° F. to 500° F., the higher temperatures being used for the shortest drying times.

Another well-known process is to form meat loaves, bacon analogs and the like using an extruder to form sheets of the meat mixtures. For bacon analogs, the extrusion can be of multiple layers. The sheets of meat products are cooked and then sliced, e.g. to prepare products resembling bacon and having alternating fat appearing and meat appearing layers. Examples of such processes are discussed in the following U.S. Patents: U.S. Pat. No. 5,236,731 issued Aug. 17, 1993 to Heinz Becker for "Process For The Manufacture Of Sliceable, Casing Free Sausage"; U.S. Pat. No. 4,667,369 issued May 26, 1987 to Eugene F. Felstehausen for "Extrusion Apparatus For Ground Meat"; U.S. Pat. No. 4,530,132 issued Jul. 23, 1985 to Richard C. Wagner for "Meat Loaf Forming Apparatus"; U.S. Pat. No. 4,305,965 issued on Dec. 15, 1981 to Earl J. Cheney for "Bacon And Meat Analogues"; U.S. Pat. No. 4,260,640 issued Apr. 7, 1981 to Hartmann, et al. for "Moulding Food Products"; U.S. Pat. No. 4,200,959 issued May 6, 1980 to Earl J. Cheney for "Apparatus For Forming Bacon Product Analogues And The Like"; U.S. Pat. No. 4,196,222 issued on Apr. 1, 1980 to Earl J. Cheney for "Process For The Preparation Of Meat And Bacon Analogues"; and U.S. Pat. No. 4,166,138 issued on Aug. 28, 1979 to Ziminski, et al. for "Preparation Of Bacon-Like Meat Analog".

In addition to the prior art described above, applicants are also aware that spiral conveyor equipment is known for a variety of food preparation processes. In such equipment, a food product may be frozen or heated as it moves along a conveyor which forms a number of tiers or levels within a spiral system.

An example of such a spiral system is shown in U.S. Pat. No. 4,079,666 issued Mar. 21, 1978 to Plemons, et al. for "Apparatus for Treating Baked Products In Order to Improve the Shelf Life Thereof". Pizza crusts are treated with ethyl alcohol after they have been cooled in a spiral path. The spiral cooler is advantageously used to reduce the size of the area required for cooling and for control of the temperature of the pizza crusts exiting the cooler by taking advantage of the ability to control conveyor speed and air temperature within the enclosure.

Cooking of food products using spiral devices is shown in U.S. Pat. No. 5,078,120 issued Jan. 7, 1992 to Hwang for "Cooking Oven for Slow Cooking of Food Products" and in Reissue 35,259 (originally U.S. Pat. No. 4,582,047) issued Jun. 4, 1996 to Williams for "High Humidity Steam Cooker With Continuously Running Conveyor". In the former, the cooking chamber (using steam or hot air) is divided into high pressure and low pressure areas for improving the efficient heat transfer therein. The food products discussed include chicken or poultry parts, hamburger patties, fish patties, vegetable foods and other food products which may be cooked in a predominantly steam atmosphere. In the latter patent, continuously operable spray detergent cleaning baths are used with a spiral steam cooker equipped with two separate steam sources. This patent also focuses on the cooking of meat, produce, fish or poultry with the steam pressure exceeding one atmosphere, at 100° C. and 100% humidity.

While these prior art processes may have proved successful for the stated purposes, there are important steps which can still be taken in improving the quality and the manufacturing of dry or semi-dry sausages. In the present case, such an improvement is made in connection with pepperoni, especially the type of pepperoni which is to be used in large quantities for the manufacture of pizzas. The present prior art practice is to prepare the pepperoni using conventional processes employing blending, stuffing the meat mixture into casings, cooking the meat mixture and curing it, following which the product is thinly sliced. The thin slices are then placed on top of the pizza for packaging.

Because the drying and curing process require from several days to several weeks, production capacity for a manufacturing facility is limited by the amount of space allocated to the drying process. The process is capital intensive, and requires a tremendous amount of product to be held in drying rooms at any given time. These current processes require the pepperoni sticks to be held in their casing during the curing and drying phase, thereby reducing the rate at which moisture can be removed from the product and adding to manufacturing cost. Holding the pepperoni in a casing during drying also prohibits slicing or dicing the product prior to drying, which would increase the surface area of the product and aid in moisture removal. Accordingly, a method of manufacturing pepperoni that overcomes these disadvantages would be a significant advance in this art.

The parent application to this continuation-in-part application describes a method in which pepperoni meat mixtures are prepared without the labor and cost intensive step of stuffing the product into casings. Instead, the mixture is fermented and cooked in a loaf form, following which the product is sliced and then preferably diced and dried in a spiral dryer which includes a plurality of tiers and in which warm and dry air is circulated down over the product to dry it in a shorter amount of time than would be possible using conventional stick drying techniques. In that application, the spiral dryer employed conventional spiral technology, i.e. the air was introduced at the top of the dryer and flowed generally in a direction opposite to that of the material flow. In other words, the tiers were arranged such that the most moist product entered at the bottom and circulated toward the top, for removal, while the air was distributed from the top and flowed downwardly with respect to the spiral tiers. The application also discusses the use of the downward, axial introduction of air and the radial flow of it over the product held on mesh conveyors.

While prior to the use by the inventors of the parent application, spiral systems were known for cooking food, such as by the use of steam, or for freezing various products such as bakery, meat products and the like, spiral technology had not been known for use in the drying small particles, such as slices or dices of pepperoni. The process described in the parent application involved a tremendous improvement in the art from the standpoint of manufacturing product which was flowable and easily handled by the manufacturers of pizza and the like, but also from the standpoint of reducing costs for labor, casing material, drying time, inventory space and the like. However, it was noted that occasionally the product had some drying inconsistencies and a tendency to overdry.

FEATURES AND SUMMARY OF THE INVENTION

A principle feature of the present invention is to provide a manufacturing process for preparing and drying pepperoni.

Another feature of the present invention is to provide a cured pepperoni product which flows easily and which may be evenly spread on other food items, such as pizza.

Yet another object of the present invention is the preparation of pepperoni in a relatively small amount of manufacturing space and in a minimal amount of time.

A different object of the present invention is to employ a spiral drying system for drying pepperoni which has been previously fermented and cooked either using casings or in loaf form and subsequently has been subdivided into sliced or diced pieces. The pepperoni is subdivided after the fermented and cooked pepperoni is cooled. The pieces are dried in a spiral dryer and the temperature and humidity of the air flow within the spiral system is controlled.

A still further feature of the present invention is to reverse the normal order of air introduction in the spiral dryer, so that the most warm and most dry air enters the spiral dryer along with the freshly divided product at the lower end and flows generally in the same direction as the product. A more even drying is attained, product is more consistent, and there is more balance with regard to moisture content.

How these and other objects of the present invention are accomplished will be described in the following "Detailed Description of the Preferred Embodiment". Generally, however, they are accomplished by a process which first includes manufacturing cooked pepperoni. This process comprises formulating a meat mixture to the desired specification and grinding the meat (for example beef and/or pork) to a size no greater than about one-half (½) inch. The meat is then added to a blender and mixed with salt, culture, water and spices, oleoresins, dextrose, and the like. Blending is carried out for up to about 5 minutes, after which a second grinding occurs, this time to a size no greater than 3/16". Bone is typically eliminated at this stage. Meat temperature is maintained below 40° F. in the preferred blending and grinding process. At this point, the prepared meat mixture may be placed into casings for fermentation and cooking, using times and using temperatures which are similar to those used in the "casing-less" process described in the following sentences. In the casing-less variation, the meat mixture is extruded onto a screen at a thickness of about three inches (3") and is transferred to ovens where it is fermented or cooked. In the present invention, the cooked sausage is thereafter chilled to an internal temperature of less than about 35° F., following which the cooked, chilled meat mixture is sliced or sliced and diced. If a casing has been used during the fermentation and cooking step, the casing may be removed or left on as desired by the end user. The pepperoni is then transferred to the conveyor of the spiral dryer where it is exposed to air maintained at about 50° F. to 120° F. and a relative humidity of less than 50% and preferably less than about 30% for a time of about ½ to 1½ hours. Air flow through the dryer which, in the preferred embodiment, includes approximately forty (40) tiers, is on the order of 75,000 to 150,000 cubic feet per minute and the air flow over the product is in the range of about 200 to 1,000 feet per minute. Air is introduced at the lower end of the spiral dryer and flows upwardly toward refrigeration coils which remove humidity picked up by the air and condense the water for disposal. The air is recycled in a closed system to steam coils where the air is heated in its dry condition and reintroduced to the bottom of the spiral dryer. While in the dryer, moisture in the meat product is reduced to a ratio of 1.6:1 or less with respect to protein. The pepperoni is then conveyed to a chiller, where it is chilled or frozen for packaging and subsequent transfer to the customer or pizza preparation line. Other ways in which the features of the invention can be accomplished will become apparent to those skilled in the art after they have read this specification, such other ways being deemed to fall within the scope of the present invention if they fall within the scope of the claims which follow.

DETAILED DESCRIPTION OF THE PREFERRED EMBODIMENT

Before proceeding to a description of the most preferred embodiment, several general comments can be made about the applicability and scope thereof.

First, the particular meat mixture, including spices, flavorings, salt, cultures and the like can be widely varied by those skilled in the art, and no claim is made herein to any particular sausage formulation, separate and apart from the processing techniques described later.

Second, while particular grind sizes will be referred to for various stages of the process, these sizes can also be varied by those skilled in the art who would also appreciate the corresponding need for further process modifications, for example in connection with times and temperatures.

Third, certain manufacturers, model names and numbers are given for machinery used in the most preferred form of the invention, but other machinery can be substituted, as will be appreciated by those skilled in the art.

Fourth, certain ranges are given for the humidity, temperature, conveyor speed, and air flow characteristics for the most preferred embodiment, based again on the particular volumes desired, space requirements and other needs of the assignee of the invention. After reading this specification, one skilled in the art will understand that the selection of optimum numbers for these variables can be made once the plant and overall process parameters of a particular processing installation are known. For example, an inlet relative humidity figure of about 30% or less is preferred, but higher humidity air, up to about 50% can be used although the drying time would increase significantly.

Fifth, preferred systems are disclosed for controlling the temperature and the humidity of the air conveyed to and removed from the housing for the spiral conveyor tiers. These also can be varied by substituting, for example, chemical for mechanical systems or open vs. closed heating/ cooling systems, depending on normal plant considerations of energy cost, plant lay-out and the like, since the temperature and humidity values used in the process tolerate some ongoing variability due to, for instance, changes in ambient plant temperatures and humidity and other related factors.

Sixth, while the present invention has a principal application in the manufacture of pepperoni, it could be used for the manufacture of other dry or semi-dry sausage products and could be readily adapted with regard to drying times, temperatures and air humidities by one skilled in the art after the present specification has been read.

Proceeding now to a description of the most preferred embodiment, the process will be described first, and then several drawings will be used to illustrate a preferred plant layout and a preferred technique for modifying a conventional spiral freezer so that it can be used as a sausage drying device in the present invention.

The first step of the process is the formulation of the meat mixture (e.g. beef, pork, poultry, etc.) to the desired specification, including the specification for fat. These specifications may be established by the processor or the customer. Initially, the meat is course ground as is well known in the pepperoni industry. In most cases this will be to a size no greater than about ½ inch.

The formulated meat is next placed into a blender where it is mixed with the desired salt, culture, water and spices, including any specified oleoresins, and dextrose. Further detail is not required here, as the recipe or formulation in and of itself does not form part of the present invention. As is the case with current practice, the blender may operate for about five minutes to thoroughly mix the ingredients.

Following blending, the meat mixture is passed through a final grinder, where it is reduced to a size no greater than about 3/16". A bone elimination system may be used here, if bone has not been eliminated earlier in the process. When the meat mixture exits the final grind station, it should optimally be at about 40° F. or less.

The next step in the process is to prepare the meat mixture for fermentation and cooking, either by stuffing it into casings, typically about 1 to 4 inches in diameter and approximately 4 feet in length, or to mechanically extrude the mixture onto screens. The remaining part of the description of the most preferred process will be based on the latter, but one skilled in the art should keep in mind as the description continues, that a casing process may be employed for the fermentation, cooking, cooling, slicing and dicing steps which are described below. For some particular applications or for some users, sliced or diced products that include a casing may be preferred, even though the product may be more costly and more time consuming to prepare.

The preferred process extrudes the sausage in sheets about two to four inches (2–4") in depth and up to twelve inches (12") in width by thirty-six inches (36") long. The sheet size, including depth can be varied, with corresponding changes in the cooking and fermenting parameters discussed. The racks are transferred to ovens where fermentation takes place, with the sausage temperature preferably held at around 100° F. for twelve to eighteen (12–18) hours. Air temperature accordingly should be kept at about 90° F. to 110° F. In a subsequent cooking step for 3–4 hours at about 140° F., the internal temperature of the sausage is raised to 128° F. or higher for an hour or longer, preferably to above 136° F. for an hour.

The cooked sausage is then cooled to an internal temperature of 35° F. or less. The cooled sausage is sliced or sliced and diced, most preferably sliced and diced, using, for example an Urschel Model M dicer, to a size of about 5/16. If slicing is employed, about 5/16" is also preferred. The size is not to be deemed as limiting the scope of the invention. For example, the slice or dice size could be ¼" or ⅜", if desired.

After slicing or slicing and dicing, the meat is placed on the continuous conveyors of specially configured spiral dryers. One type of spiral system which may be modified for use in the present invention is the Frigoscandia Gyro Compac Spiral Conveyor Model GC106. In this device, product enters at the bottom of the housing and spirals about a number of conveyor tiers and exits near the top of the equipment. The number of tiers is readily determined by those familiar with this technology by calculating the initial moisture level of the product, the desired final moisture level, the relative humidity of the air, the total amount of water which must be removed, the temperature, and the conveyor speed. In the preferred system of the present invention, the conveyor provides approximately 7,000 square feet of product area, with an average area per tier of 190 square feet and 38–42 tiers.

The conveyor is moved at speeds which may be controlled, but it is preferable to use a conveyor speed of approximately 20 to 40 feet per minute. An air flow of 200 to 1,000 linear feet per minute of air is acceptable. A notable difference, however, in the process of this invention, as opposed to that described in the parent application, is that the direction of air flow is reversed so that the air enters the spiral dryer at the bottom and exits at the top.

Optimally, the spiral conveyor and air flow system is used to reduce the amount of moisture contained in the diced or sliced product, from initial levels on the order of 50% to a final moisture content producing a ratio of moisture to protein of 1.6:1. This is accomplished by exposing the pepperoni within the conveyor to air which has been dried to a relative humidity of less than about 50%, preferably less than about 30%, for up to about 1½ hours using turbulent air flow, thirty minutes to one hour being preferred. The temperature of the air entering the dryer is maintained between about 50° F. to 120° F. For pepperoni, an optimal air introduction temperature is approximately 110° F., with a moisture content of about 18% relative humidity.

A large capacity air-handling system would provide a capability of moving about 120,000 cubic feet per minute of air. The system would involve the use of variable or fixed speed fans positioned adjacent the spiral drying cabinet, the fan pushing air through the stack of conveyor tiers at an air velocity of 750 feet/min. or more across the coils.

Another characteristic of the drying process of this invention is to pass the air internally into the center of the spiraling tiers from the bottom and allowing the air to move radially outwardly over the food product and up through the wire mesh racks which form the individual conveyor tiers. In this case, the air is exposed to the product which is most moist and the air continues to pick up moisture as the product dries as it encircles the spiral dryer and approaches the top of the system. At the top, the air will typically have lost 30° F. or more when compared to the inlet temperature and have a relative humidity approaching 65%. The air exiting the top is collected in a closed air flow system, passed over ammonia cooled refrigeration coils and chilled to 32° F. to condense water therefrom, which water may be readily collected for disposal. As mentioned previously other systems for removing the water, such as the use of chemical desiccants or other chemicals can be used in place of chillers, but such systems are typically more expensive than using refrigeration equipment which is known and widely available.

Returning to the overall process characteristics, the dried pepperoni is conveyed from the upper part of the drying cabinet to a freezing tunnel or other system for chilling or freezing the product for packaging or otherwise transferred for use with a particular final product, such as pizza. While drying can be completed in about ½ hour to about 1½ hours, the time required for freezing or chilling the product, preferably to less than about 35° F., will be dependent upon the length of the freezer tunnel, the temperatures maintained therein and conveyor speeds. In our most preferred embodiment a spiral freezer is used to complete the process.

Figure 1:
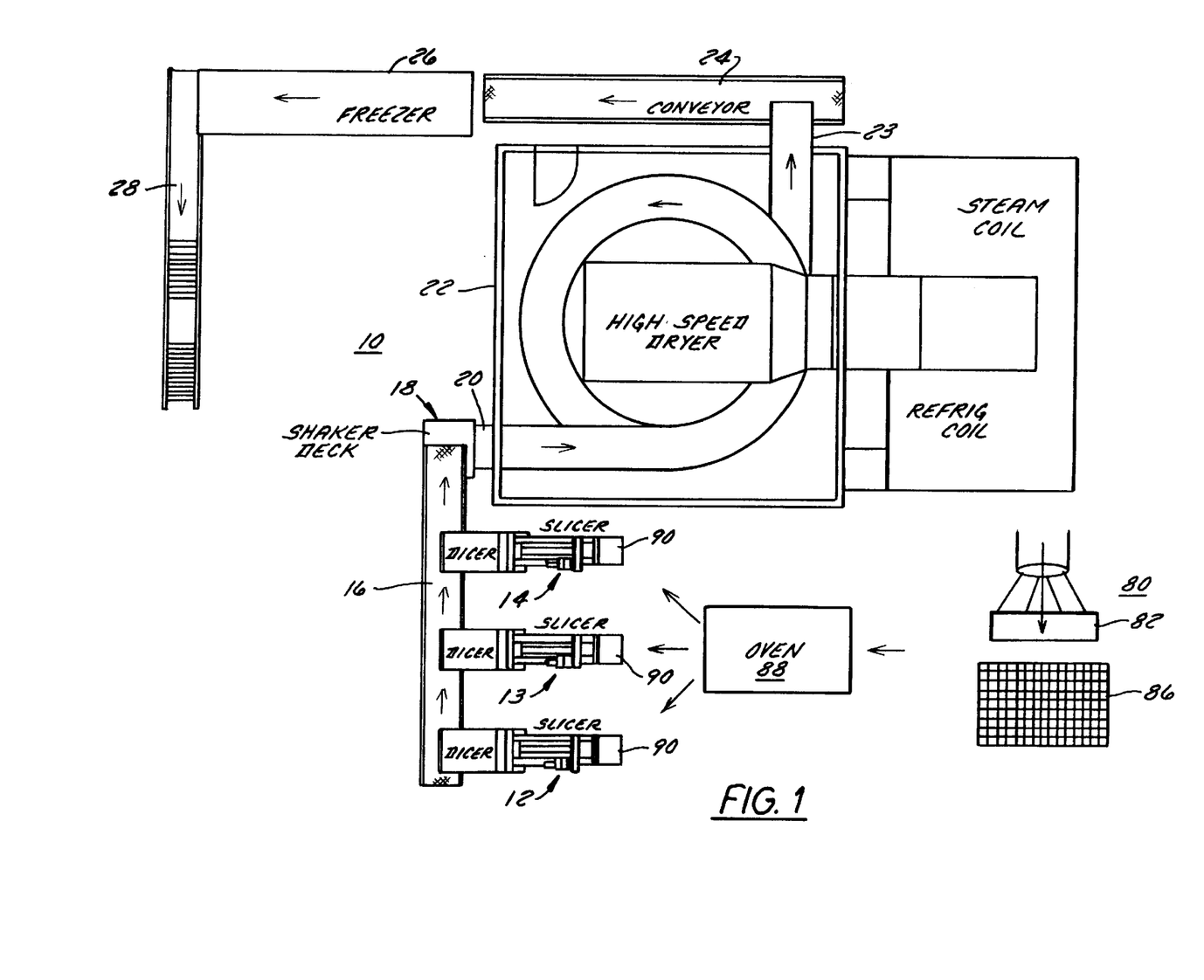
FIG. 1 is a top schematic view of equipment used to carry out the pepperoni slicing, dicing, drying and freezing steps of the preferred form of the present invention as described and claimed in the parent application.

Proceeding now to a description of the drawings, FIG. 1 shows one plant lay-out for carrying out the latter steps of the process of the most preferred embodiment of the prevent invention. The blending equipment is not shown, as such equipment is well known. In FIG. 1, the slicing and dicing, drying and cooling system 10 is shown to include a series of dicing machines 12, 13 and 14, each of which deposits diced pepperoni onto a transfer conveyor 16. Conveyor 16 terminates at a shaker deck 18 where product is uniformly distributed onto the continuous conveyor 20 of the high speed drying unit 22. The spiral nature of the high speed dryer 22 is schematically illustrated in this drawing with only a single spiral tier, but as indicated above, numerous tiers are used. See also FIG. 3 for another view of the spiral dryer of the parent application. The output from the high speed dryer 22 is deposited on another transfer conveyor 24 for being moved toward freezer 26. As product passes through the freezer 26, it is cooled as indicated above. Finally, cooled product is deposited on a processing conveyor 28 for transport to scales, packaging systems and the like. The extrusion equipment is illustrated at area 80 on FIG. 1. The feed tube 82 of the extruder 84 and screen 86 are illustrated diagrammatically. The cooking area 88 is also illustrated in schematic form only, as that equipment, in and of itself, is conventional. In our preferred cooking ovens, up to twenty-four of the screens 86 are placed in a rack within cooking ovens 88 and a plurality of racks fit within each oven. Slicers 90 are located in front of the dicers 12, 13 and 14.

Figure 2:
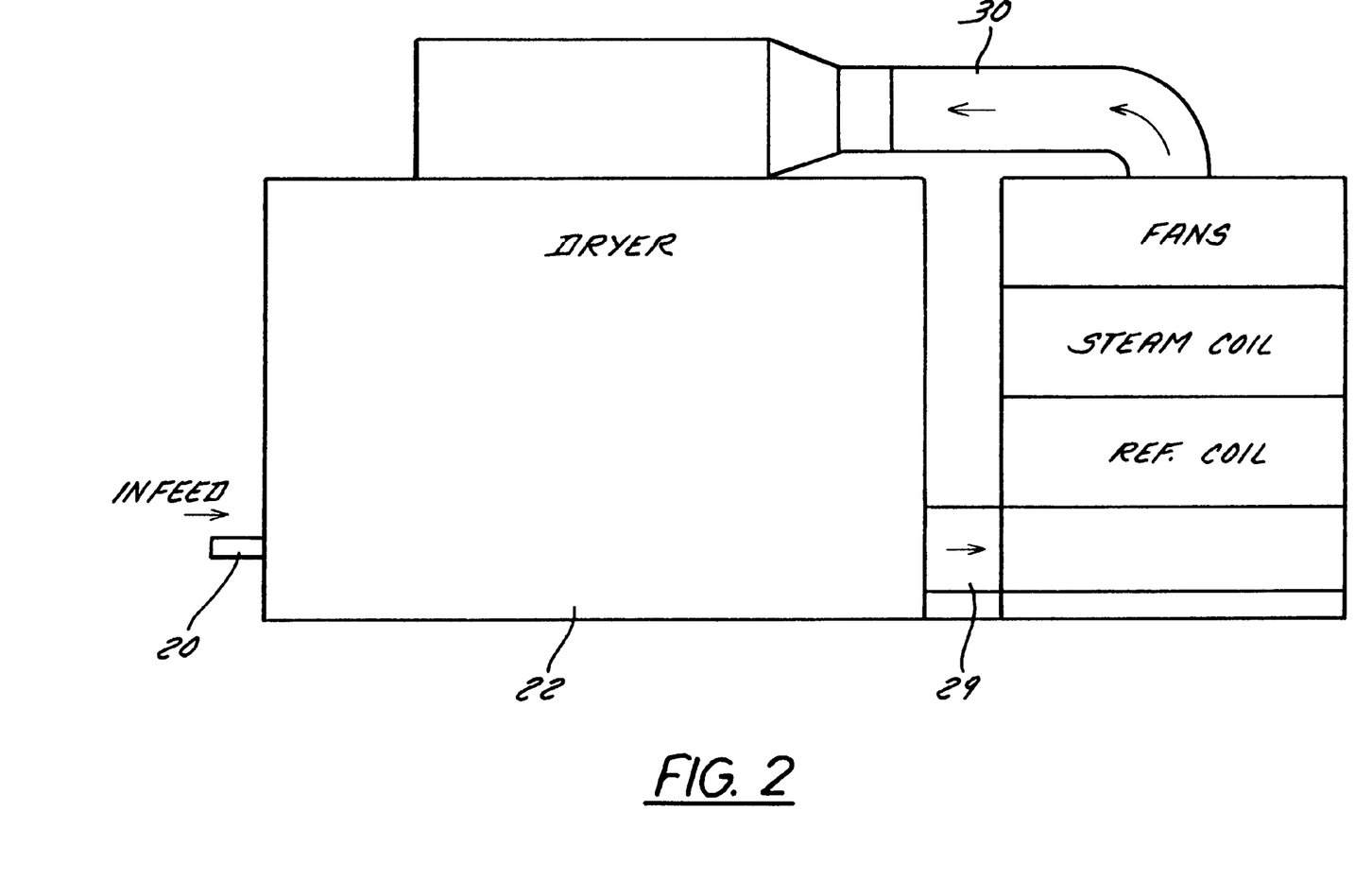
FIG. 2 is a side view of the spiral dryer shown in FIG. 1.

FIG. 2 shows in schematic form the dryer of the parent application, the infeed conveyor 20, the high speed dryer 22 and two air ducts 28 and 30. Duct 28 is a return duct leading from the lower portion of the dryer cabinet while duct 30 is shown at the top of the unit. As explained previously, the warmed, and dry air enters dryer 22 from the top thereof, passes downwardly through the coils or tiers of the dryer and leaves through the bottom. Such air flow is schematically illustrated by the arrows in this figure.

FIG. 2 also schematically illustrates the refrigeration coils and steam coils used in the present invention, as well as the fans located at the top of the coil stack for directing air into duct 30. The refrigeration coils are used primarily to remove humidity from the air (and may be replaced by chemical desiccant systems as mentioned above), following which the air is moved through steam coils to raise it to the appropriate temperature.

Figure 3:
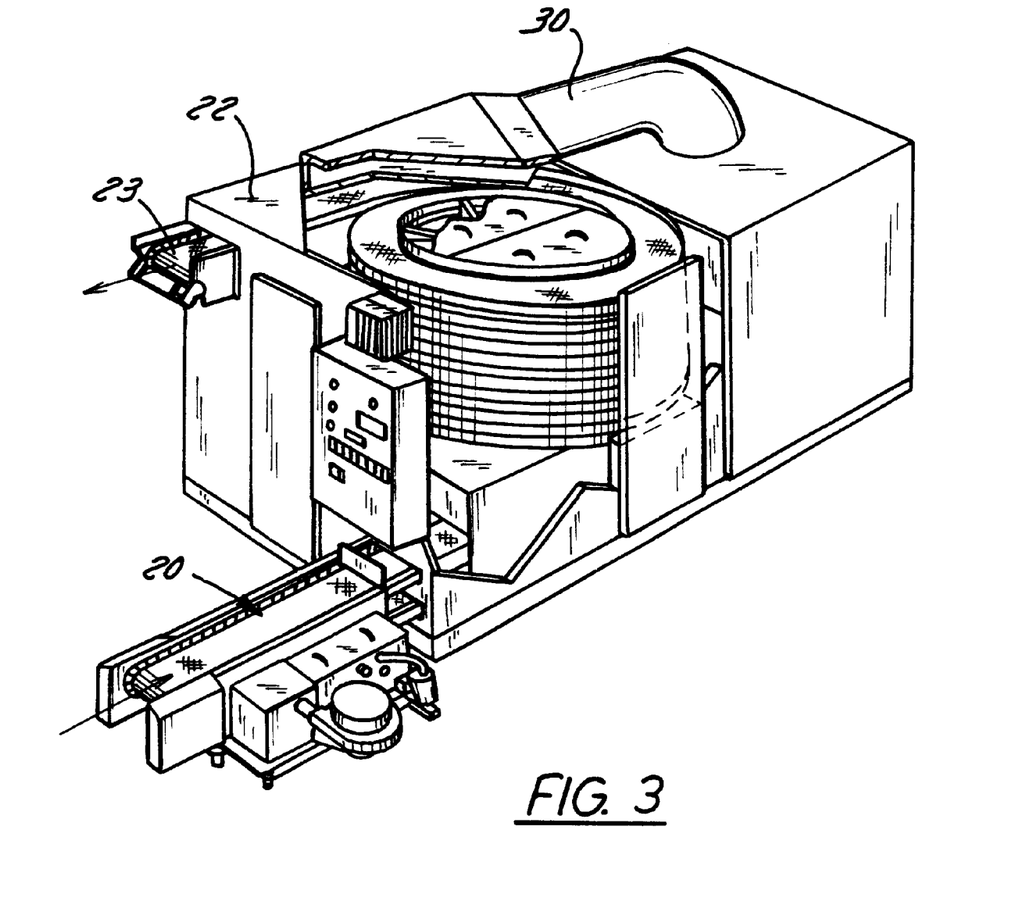
FIG. 3 is a schematic illustration of the spiral dryer shown in FIG. 1, with parts broken away to illustrate internal components.

FIG. 3 is a schematic illustration of the dryer 22 with the infeed conveyor and output conveyors 20 and 23, respectively. The figure is cut away to show in schematic form the spiral nature of the tiered conveyor located therewithin. As indicated above, in the most preferred form of the invention, 38–40 tiers are used, more than is shown in the schematic illustration.

Figure 4:
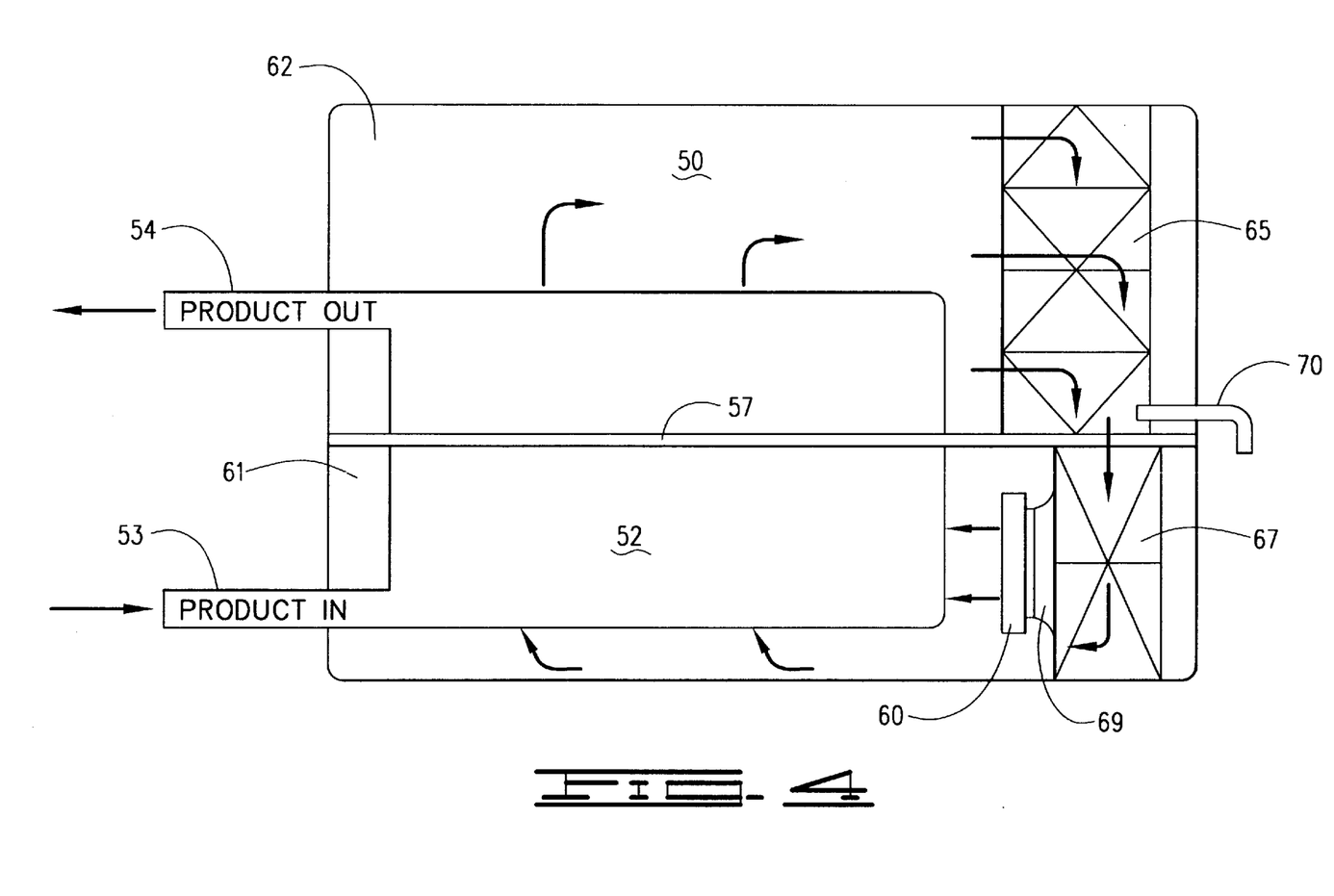
FIG. 4 is a side schematic view of the spiral dryer according to the most preferred form of the present invention.

A schematic illustration of the spiral dryer system 50 according to the most preferred form of this invention is shown in FIG. 4. The dryer system 50 includes the spiral conveyor 52 having a product infeed 53 and product discharge 54. Spiral dryer 52 is located in a room or chamber defined by the outer line of this FIGURE. The room is divided by a mezzanine floor 57 into lower and upper chambers, 61 and 62 respectively. Blowers 60 (three blowers are used in the most preferred form of the invention) force air into the lower chamber 61 of the room and up through the bottom of dryer 52 (the only path to the upper chamber 62) and through the product moving along the tiers on the continuous mesh conveyor. Air exits the dryer 52 in the upper chamber 62.

The air conditioning system is shown at the right side of FIG. 4 and includes a set of refrigeration coils shown generally at 65 which receive the cooled, moist air from chamber 62 and condense from it sufficient moisture to reduce the humidity level of the circulating air to below 30% and preferably to 18%. Air passes from the refrigeration coil 65 through coils 67 heated by steam. The inlet 69 to the blower is coupled to the outlet from the steam coils 67. As can be noted, the closed loop conditioned air system pushes the conditioned air through the product in a direction opposite to that employed in prior art spiral cookers, spiral freezers and the spiral dryer described and claimed in the parent application. Water is removed in the closed loop system and discharged through pipe 70 which collects condensation from the refrigeration coils 65.

Several specifications will now be provided with regard to the preferred spiral dryer system 50. The air flow across the coils should be at least 750 feet/minute, and the belt speed within the dryer 52 should be in the range of 20–40 feet/minute. Steam pressure within the coils used to heat the air ranges between 90–100 psi, while the compressor for the refrigeration coils operates at 38–45 psi. In its most preferred form, air is introduced to the dryer 52 at approximately 110° F., although temperatures between 50° F. and 120° F. can be used, while the air leaving the top of dryer 52 typically has a temperature of 70° F. or less and a relative humidity of 50% or more.

Although the present invention has primary applicability for the preparation of dry or semi-dry sausages, other types of food products may be dried at an accelerated rate in the dryer 52 or the new spiral dryer system 50. By the use of such a dryer, overall processing time for making pepperoni is dramatically reduced, but just as importantly, the flowability of the resulting product is increased. Consistent, evenly-dried product also is produced. For example, a plurality of diced pepperoni pieces can be squeezed together under hand pressure, and they will separate freely thereafter, unlike the oily feel and tendency to clump which would occur when using sliced pepperoni made by conventional processes. Substantial processing time, and the costs associated therewith are reduced using a system which occupies relatively little plant space and which is highly reliable.

Now that the equipment and the processes have been described in sufficient detail to enable one skilled in the art to practice the preferred form of the invention, it will be even more apparent how variations of time, temperature and humidity can be made by those skilled in the art to take into account a particular processing environment. For example, relatively more heat must be added to the air flow in colder climates. On the other hand, if processing were to take place in humid, warm environments, such as the southern part of the United States, especially during the summer months, additional refrigeration capacity might be needed to lower humidity to a level of less than 30%. It might also be necessary to maintain the air in a cooled condition downstream of the refrigeration coils if ambient temperatures are excessive.

While the foregoing invention has been described in connection with a preferred embodiment, it is not to be limited thereby but is to be limited solely by the scope of the claims which follow.

What is claimed is:

1. A process of preparing sausage comprising the steps of:
   preparing a meat mixture, extruding the meat mixture into sheet form, fermenting the mixture at a temperature of at least 90° for at least twelve hours and cooking the resulting sausage such that the internal temperature thereof is at least 120° F. for at least an hour;
   cooling the cooked sausage to a temperature sufficiently low to permit slicing;
   slicing the sausage;
   depositing the sausage slices onto a conveyor of a spiral dryer;
   passing conditioned air into and through the spiral dryer, the conditioned air having a relative humidity below about 50% and a temperature in the range of about 50° F. to about 120° F. when introduced into the spiral dryer;
   conveying the sausage through the spiral dryer for a time sufficient to reduce the moisture to a predetermined level; and
   wherein the sausage and conditioned air enter a lower portion of the spiral dryer such that the sausage and air move through the dryer in substantially the same direction, whereby the conditioned air removes moisture from the sausage and drops in temperature as it moves upwardly through the dryer and exits the dryer at an upper portion thereof.

2. The process of claim 1 wherein the sliced sausage is diced before it enters the spiral dryer.

3. The process of claim 1 wherein the cooling step is carried out until the sausage has an internal temperature of 35° F. or less.

4. The process of claim 1 wherein the conditioned air is passed through the dryer in a volume sufficient to cause a linear air flow over the diced sausage of more than 200 feet per minute as it is being conveyed through the dryer.

5. The process of claim 4 wherein the linear air flow velocity exceeds 200 feet per minute but is less than about 1,000 feet per minute.

6. The process of claim 1 wherein the spiral dryer includes a plurality of conveyor tiers arranged about a vertical axis, a conveyor entrance at a lower part of the dryer and a conveyor exit at an upper part of the dryer, and wherein the conveying step is carried out by introducing the sausage into the dryer at the entrance and removing it at the exit.

7. The process of claim 1 wherein the dried sausage is cooled after it leaves the spiral dryer.

8. The process of claim 1 wherein the dried sausage is frozen after it leaves the spiral dryer.

9. The process of claim 1 wherein the sliced sausage is passed through the spiral dryer in less than 1½ hours.

10. The process of claim 2 wherein the diced sausage is passed through the spiral dryer in less than 1½ hours.

11. The process of claim 1 wherein the cooked sausage is sliced to a thickness of 5/16" or less.

12. The process of claim 1 wherein the meat mixture is a pepperoni meat mixture and the dried sausage is pepperoni.

13. A process for making diced pepperoni comprising blending a pepperoni meat mixture with water, salt, culture and seasonings, extruding the blended meat mixture into sheets, fermenting and cooking the sheets of sausage resulting from the extrusion step, cooling the cooked sausage to below 35° F., slicing the cooled sausage to a thickness of about 5/16", thereafter dicing the cooled sausage to a size of about 5/16", placing the diced sausage on a moving conveyor of a spiral dryer and drying the sausage to a moisture to protein ratio of 1.6:1 or less in less than 1½ hours by passing conditioned air over the sausage in the spiral dryer, the air introduced to the dryer being at a relative humidity of about 50% or less and a temperature in the range of about 50° F. to 120° F., and wherein both the sausage and conditioned air enter a lower portion of the dryer such that the sausage and air move through the dryer in substantially the same direction, the conditioned air increasing in moisture content and dropping in temperature as it moves upwardly through the dryer and exiting at an upper portion thereof.

14. The process of claim 13 wherein the air flow over the sausage in the spiral dryer is within the range of about 200 to 1,000 feet per minute.

15. A system for making dried sausage comprising:
an extruder for extruding a blended sausage meat mixture onto screens for ovens for fermenting and cooking the meat mixture;
a chiller for cooled cooked sausage;
slicers for slicing the cooled sausage;
dicers for dicing the sliced cooled sausage;
a spiral dryer having a conveyor passing therethrough in a plurality of spirally-arranged tiers, said dryer having an air inlet in a lower portion thereof and an air outlet at an upper portion thereof;
air conditioning means coupled to the lower portion of the spiral dryer for introducing conditioned air therein having a relative humidity of less than about 50% and a temperature in the range of about 50–120° F.; and
removing air from the upper portion of the spiral dryer, said air having been cooled and increased in relative humidity as it is moved upwardly over the sausage in the dryer in substantially the same direction as the sausage.

16. The system of claim 15 wherein the air conditioning system includes refrigeration coils for reducing the humidity of air passing through the coils and heater coils for raising the temperature of air passing therethrough.

17. The system of claim 15 further including a cooler for reducing the temperature of the dried, diced sausage after it leaves the spiral dryer.

18. A system for making dried pepperoni comprising:
an extruder for extruding a blended pepperoni meat mixture onto screens;
an oven for fermenting and cooking the meat mixture to prepare cooked pepperoni sausage;
a chiller for cooling the cooked pepperoni sausage;
slicers for slicing the cooled pepperoni;
a spiral dryer having a conveyor passing therethrough and a plurality of spirally-arranged tiers;
air conditioning means coupled to a lower portion of the spiral dryer for introducing conditioned air into the lower portion of the dryers having a relative humidity of less than about 50% and a temperature in the range of about 50° to 120°;
passing the air upwardly over the upwardly-moving sausage so that the air cools and increases in relative humidity; and
removing the air which has cooled and increased in relative humidity from an upper portion of the spiral dryer.

19. The system of claim 18 wherein the air conditioning system includes refrigeration coils for reducing the humidity of air passing through the coils and heater coils for raising the temperature of air passing therethrough.

20. A process of preparing sausage comprising the steps of:
preparing a meat mixture, stuffing the meat mixture into sausage casings and fermenting and cooking the resulting sausage in an oven;
cooling the cooked sausage to a temperature sufficiently low to permit slicing;
slicing the sausage;
depositing the sausage slices onto the conveyor of a spiral dryer;
passing conditioned air into and upwardly through the spiral dryer, the conditioned air having a relative humidity of about 50% and a temperature in the range of about 50° F. to about 120° F. when introduced into the spiral dryer;
conveying the sausage through the spiral dryer for a time sufficient to reduce the moisture level to a desired level; and
wherein the sausage and conditioned air enter a lower portion of the spiral dryer such that the sausage and air move through the dryer in substantially the same direction, the conditioned air increasing in moisture content and dropping in temperature as it passes over the sausage and exits through an upper portion of the dryer.

21. The process of claim 20 wherein the sliced sausage is diced before it enters the spiral dryer.

22. The process of claim 20 wherein the casing is removed prior to slicing.

23. The process of claim 20 wherein the cooling step is carried out until the sausage has an internal temperature of 35° F. or less.

24. The process of claim 20 wherein the conditioned air is passed through the dryer at a volume sufficient to cause a linear air flow over the sausage of more than 200 feet per minute as it is being conveyed through the dryer.

25. The process of claim 24 wherein the linear air flow velocity exceeds 200 feet per minute but is less than about 1,000 feet per minute.

26. The process of claim 20 wherein the spiral dryer includes a plurality of conveyor tiers arranged about a vertical axis, a conveyor entrance at a lower part of the dryer and a conveyor exit at an upper part of the dryer, and wherein the conveying step is carried out by introducing the sausage into the dryer at the entrance and removing it at the exit.

27. The process of claim 20 wherein the dried sausage is cooled after it leaves the spiral dryer.

28. The process of claim 20 wherein the dried sausage is frozen after it leaves the spiral dryer.

29. The process of claim 20 wherein the sliced sausage is passed through the spiral dryer in less than 1½ hours.

30. The process of claim 21 wherein the diced sausage is passed through the spiral dryer in less than 1½ hours.

31. The process of claim 20 wherein the cooked sausage is sliced to a thickness size of 5/16" or less.

32. The process of claim 20 wherein the meat mixture is a pepperoni meat mixture and the dried sausage is pepperoni.

33. The process of claim 22 wherein the casing is removed after cooling the sausage and before slicing the sausage.

34. A process for making diced pepperoni comprising blending a pepperoni meat mixture with water, salt, culture and seasonings, stuffing the blended pepperoni into sausage casings, fermenting and cooking the sausage in the sausage casings, cooling the cooked sausage to below 35° F., slicing the cooled sausage, thereafter dicing the cooled sausage to a cube size of about 5/16", placing the diced sausage on a moving conveyor of a spiral dryer so that the sausage is moved upwardly through the dryer and drying the sausage to a moisture to protein ratio of 1.6:1 or less in less than 1½ hours by passing conditioned air upwardly over the sausage in the spiral dryer, the air introduced to the dryer being at a relative humidity of 50% or less and a temperature in the range of about 50° to 120° and wherein both the sausage and conditioned air enter a lower portion of the spiral dryer such that the sausage and air move through the dryer in substantially the same direction, the conditioned air removing moisture from the sausage and dropping in temperature as it moves upwardly through the dryer and exiting at an upper portion thereof.

35. The process of claim 34 wherein the air flow over the sausage in the spiral dryer is within the range of about 200 to 1,000 feet per minute.

36. A system for making dried sausage comprising:
means for stuffing a blended meat mixture into sausage casings;
ovens for fermenting and cooking the meat mixture;
a chiller for cooling the cooked sausage;
slicers for slicing the cooled sausage;
dicers for dicing the sliced, cooled sausage;
a spiral dryer having a conveyor passing therethrough in a plurality of spirally-arranged tiers;
an air conditioning system coupled to a lower portion of the spiral dryer for introducing conditioned air having a relative humidity of less than about 50% and a temperature in the range of about 50–120° F.; and
means for removing the air which has cooled and increased in relative humidity from an upper portion of the spiral dryer as a result of passing over the upwardly-moving sausage in the dryer.

37. The system of claim 36 further comprising a system for removing the casings, the casing removing system being located after the chiller and before to the slicers.

38. The system of claim 36 wherein the air conditioning system is a closed system and includes refrigeration coils for reducing the humidity of air and heater coils for raising the temperature of air.

39. The system of claim 36 further including a cooler for reducing the temperature of the dried, diced sausage after it leaves the spiral dryer.

40. A system for making dried pepperoni comprising:
means for stuffing a blended meat mixture into pepperoni casings;
ovens for fermenting and cooking the meat mixture;
a chiller for cooling the cooked pepperoni;
slicers for slicing the cooled pepperoni;
dicers for dicing the sliced, cooled pepperoni;
a spiral dryer having a conveyor passing therethrough in a plurality of spirally-arranged tiers;
an air conditioning system coupled to a lower portion of the spiral dryer for introducing conditioned air having a relative humidity of less than about 50% and a temperature in the range of about 50–120° F.; and
means for removing the air which has cooled and increased in relative humidity from an upper portion of the spiral dryer as a result of passing over the upwardly-moving sausage in the dryer.

41. The system of claim 40 wherein the air conditioning system in a closed system and includes refrigeration coils for reducing the humidity of air and heater coils for raising the temperature of air.

* * * * *

UNITED STATES PATENT AND TRADEMARK OFFICE
CERTIFICATE OF CORRECTION

PATENT NO. : 6,524,633 B2 Page 1 of 1
DATED : February 25, 2003
INVENTOR(S) : Luke B. Rainbolt, James Roberds and Kyle A. Newkirk It is certified that error appears in the above-identified patent and that said Letters Patent is hereby corrected as shown below:

<u>Column 1,</u>
Line 55, delete "¼1" and substitute -- ¼ -- therefor.

Signed and Sealed this

Sixth Day of May, 2003

JAMES E. ROGAN
*Director of the United States Patent and Trademark Office*